C. ALLEN.
HORSESHOE.
APPLICATION FILED FEB. 16, 1912.
1,026,842.
Patented May 21, 1912.
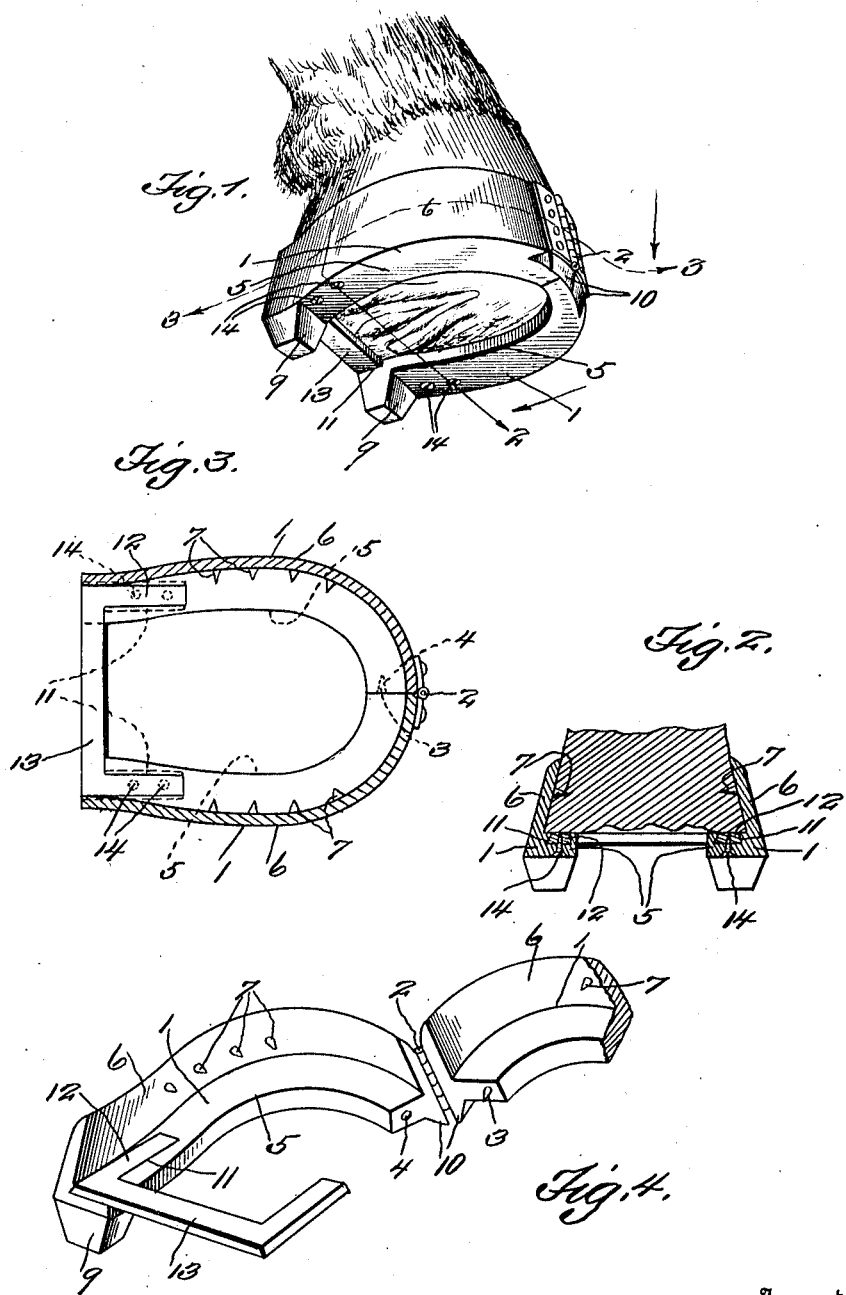
Witnesses
Francis T. Boswell.
C. E. Clements.
Inventor
Charles Allen,
By D. Swift & Co.
Attorneys

UNITED STATES PATENT OFFICE.

CHARLES ALLEN, OF WINIFREDE, WEST VIRGINIA.

HORSESHOE.

1,026,842. Specification of Letters Patent. Patented May 21, 1912.

Application filed February 16, 1912. Serial No. 677,952.

*To all whom it may concern:*

Be it known that I, CHARLES ALLEN, a citizen of the United States, residing at Winifrede, in the county of Kanawha and State of West Virginia, have invented a new and useful Horseshoe; and I do hereby declare the following to be a full, clear, and exact description of the invention, such as will enable others skilled in the art to which it appertains to make and use the same.

This invention relates to a new and useful horseshoe.

The invention aims as its primary object to provide a horse-shoe, which may be secured to the hoof without nails.

It is a further aim of the invention to construct a horse-shoe having various simple, practical and desirable features of construction.

One of the features of the construction is the production of two hingedly connected members, which when closed fit the hoof in a socket-like manner.

The essential feature of the construction is a U-shaped tie-bar, the two arms of which are dovetailed in the rear ends of the hingedly connected members, for holding them clamped upon the hoof, while the pointed lugs of the members penetrate the hoof, to further insure against displacement.

The invention comprises further features and combination parts, as hereinafter set forth, shown in the drawings and claimed.

In the drawings:—Figure 1 is a view in perspective showing the improved shoe as applied to a hoof. Fig. 2 is a cross sectional view on line 2—2 of Fig. 1. Fig. 3 is a sectional view on line 3—3 of Fig. 1. Fig. 4 is a detailed view of the shoe removed from the hoof, showing the hingedly connected members partly open, with the tie-bar connected to one of the members.

Referring to the drawings 1 designates the hinged members of the horse-shoe, which are hinged together as at 2, there being a lug 3 on one of the members to engage a depression 4 in the opposite member, to prevent distortion of the members when closed and upon the hoof. Each member consists of a base 5, upwardly from which a flange 6 extends. The inner walls of the flanges are inclined, to fit the correspondingly inclined outer wall of the hoof. By the provision of the inclined walls of the members, the shoe securely holds to the hoof in a socket-like manner. To further insure security of the shoe upon the hoof, the lugs 7, which project from the inclined walls of the flanges, are provided, which lugs embed themselves in the hoof. The rear or heel ends of the members are provided with the usual calks 9, while the toe or forward ends of the members are provided with the toe calks 10. The upper portions of the bases 5 of the members at their rear or heel ends are provided with L-shaped recesses 11, in which the arms 12 of the U-shaped tie-bar 13 are dovetailed. To prevent rearward movement of the tie-bar screws 14 are inserted through the base portions of the members, and into the arms of the tie-bar. The arms 12 are dovetailed in this manner, to hold the tie-bar in position, until the screws are fully inserted.

To apply the shoe upon the hoof, the members are brought together until the inclined walls thereof contact firmly with the wall of the hoof, and the lugs 7 are embedded therein. Subsequently the tie-bar is connected to the members, by inserting the arms 12 in the L-shaped recesses from the rear, and then finally the screws 14 are forced through the base portions of the members.

The invention having been set forth, what is claimed as new and useful is:—

1. In combination, a pair of complementary members hingedly connected at their forward portions, the members having upwardly extending flanges with inclined inner walls to fit the inclined wall of a hoof, the flanges having a series of lugs to embed in the hoof, the rear ends of the members having L-shaped recesses provided with beveled walls, and a U-shaped tie-bar having arms dovetailed in the L-shaped recesses, and means penetrating the members to prevent rearward movement of the tie-bar.

2. In combination, a pair of complementary members hingedly connected at their forward portions, the members having upwardly extending flanges with inclined inner walls to fit the inclined wall of a hoof, the rear ends of the members having L-shaped recesses, a U-shaped tie-bar having arms dovetailed in the L-shaped recesses, and means penetrating the members and into the arms to prevent rearward movement of the tie-bar.

3. In combination, a pair of correspondingly-shaped members constituting a socket-like fitting horse-shoe, the members being hingedly connected at the toe portion of the shoe, the heel ends of the members having L-shaped recesses, a U-shaped tie-bar with arms dovetailed in the recesses, and means penetrating the heel of the members and into the arms to prevent rearward movement of the tie-bar.

In testimony whereof I have signed my name to this specification in the presence of two subscribing witnesses.

CHARLES ALLEN.

Witnesses:
L. T. TROTTER,
E. ISTIJSAN.